(12) United States Patent
Otomo

(10) Patent No.: US 7,752,477 B2
(45) Date of Patent: Jul. 6, 2010

(54) SIGNAL PROCESSOR AND METHOD FOR PROCESSING A SIGNAL

(75) Inventor: Goichi Otomo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1091 days.

(21) Appl. No.: 11/207,768

(22) Filed: Aug. 22, 2005

(65) Prior Publication Data

US 2006/0041773 A1 Feb. 23, 2006

(30) Foreign Application Priority Data

Aug. 23, 2004 (JP) .............................. P2004-242580

(51) Int. Cl.
*H03B 19/00* (2006.01)
(52) U.S. Cl. ...................... 713/401; 713/400; 713/500; 713/501; 713/502; 713/503; 713/600; 713/601; 327/116; 327/119; 327/158; 327/159
(58) Field of Classification Search ......... 713/400–401, 713/500–503, 600–601; 327/116, 119, 158, 327/159
See application file for complete search history.

(56) References Cited

U.S. PATENT DOCUMENTS 5,859,549 A * 1/1999 Shuholm .................... 327/151
6,021,504 A * 2/2000 Yamasaki ................... 713/400
6,118,314 A * 9/2000 Arnould et al. ............. 327/141
6,313,879 B1 11/2001 Kubo et al.
6,380,982 B1 * 4/2002 Obitsu ........................ 348/552
6,621,523 B2 * 9/2003 Obitsu ........................ 348/552
6,876,236 B2 * 4/2005 Aman ......................... 327/121
2006/0069971 A1 * 3/2006 Waschura et al. ........... 714/724
2006/0176963 A1 * 8/2006 Barthel et al. .......... 375/240.28

FOREIGN PATENT DOCUMENTS

| JP | 7-107494 | 4/1995 |
|---|---|---|
| JP | 11-220365 | 8/1999 |

* cited by examiner

*Primary Examiner*—Abdelmoniem Elamin
(74) *Attorney, Agent, or Firm*—Oblon, Spivak, McClelland, Maier & Neustadt, L.L.P.

(57) ABSTRACT

A signal processor includes a reference clock generator configured to generate a reference clock as a synchronization reference for a signal processing. A counter is configured to count the reference clock. A frequency controller is configured to sample a count value of the counter by utilizing an input clock, to compare an increment value increased from the last sampled value with an expected value, and to control a frequency of the reference clock in accordance with a comparison result.

15 Claims, 5 Drawing Sheets

US 7,752,477 B2

SIGNAL PROCESSOR AND METHOD FOR PROCESSING A SIGNAL

CROSS REFERENCE TO RELATED APPLICATION AND INCORPORATION BY REFERENCE

This application is based upon and claims the benefit of priority from prior Japanese Patent Application P2004-242580 filed on Aug. 23, 2004; the entire contents of which are incorporated by reference herein.

BACKGROUND OF THE INVENTION

1. Field of the Invention

The present invention relates to a signal processor and method for processing a signal, capable of executing an encoding and a decoding of the signal.

2. Description of the Related Art

A signal processor capable of encoding and decoding a video input signal, an audio input signal, and an input bit stream in accordance with a moving picture expert group (MPEG) standard executes the encoding and the decoding by utilizing a reference clock which is a synchronization reference. In decoding the input bit stream conformed to MPEG2-transport stream (TS) standard, the reference clock is generated by utilizing a program clock reference (PCR) included in the input bit stream.

On the other hand, in encoding the video input signal and the audio input signal, the reference clock is generated by utilizing one of a video input clock and an audio input clock provided with one of the video input signal and the audio input signal. In this case, phase locked loop (PLL) circuits are required for the video input clock and the audio input clock.

However, since a PLL circuit includes a capacitor having a large capacity, it is difficult to reduce the size of the PLL circuit. Furthermore, PLL circuit costs more than the other digital circuits. Therefore, the cost and the size of the entire signal processor increase in proportion to the number of PLL circuits.

SUMMARY OF THE INVENTION

An aspect of the present invention inheres in a signal processor encompassing, a reference clock generator configured to generate a reference clock as a synchronization reference for a signal processing, a counter configured to count the reference clock, and a frequency controller configured to sample a count value of the counter by utilizing an input clock, to compare an increment value increased from the last sampled value with an expected value, and to control a frequency of the reference clock in accordance with a comparison result.

Another aspect of the present invention inheres in a signal processor encompassing, a reference clock generator configured to generate a reference clock as a synchronization reference for a signal processing, a counter configured to count the reference clock, and a frequency controller configured to sample a count value of the counter by utilizing a synchronization signal of a video input signal, to compare an increment value increased from the last sampled value with an expected value, and to control a frequency of the reference clock in accordance with a comparison result.

Still another aspect of the present invention inheres in a method for processing a signal encompassing, generating a reference clock as a synchronization reference for a signal processing, generating a count value by counting the reference clock, sampling the count value by utilizing an input clock, comparing an increment value increased from the last sampled value with an expected value, and controlling a frequency of the reference clock in accordance with a comparison result.

DETAILED DESCRIPTION OF THE INVENTION

Figure 1:
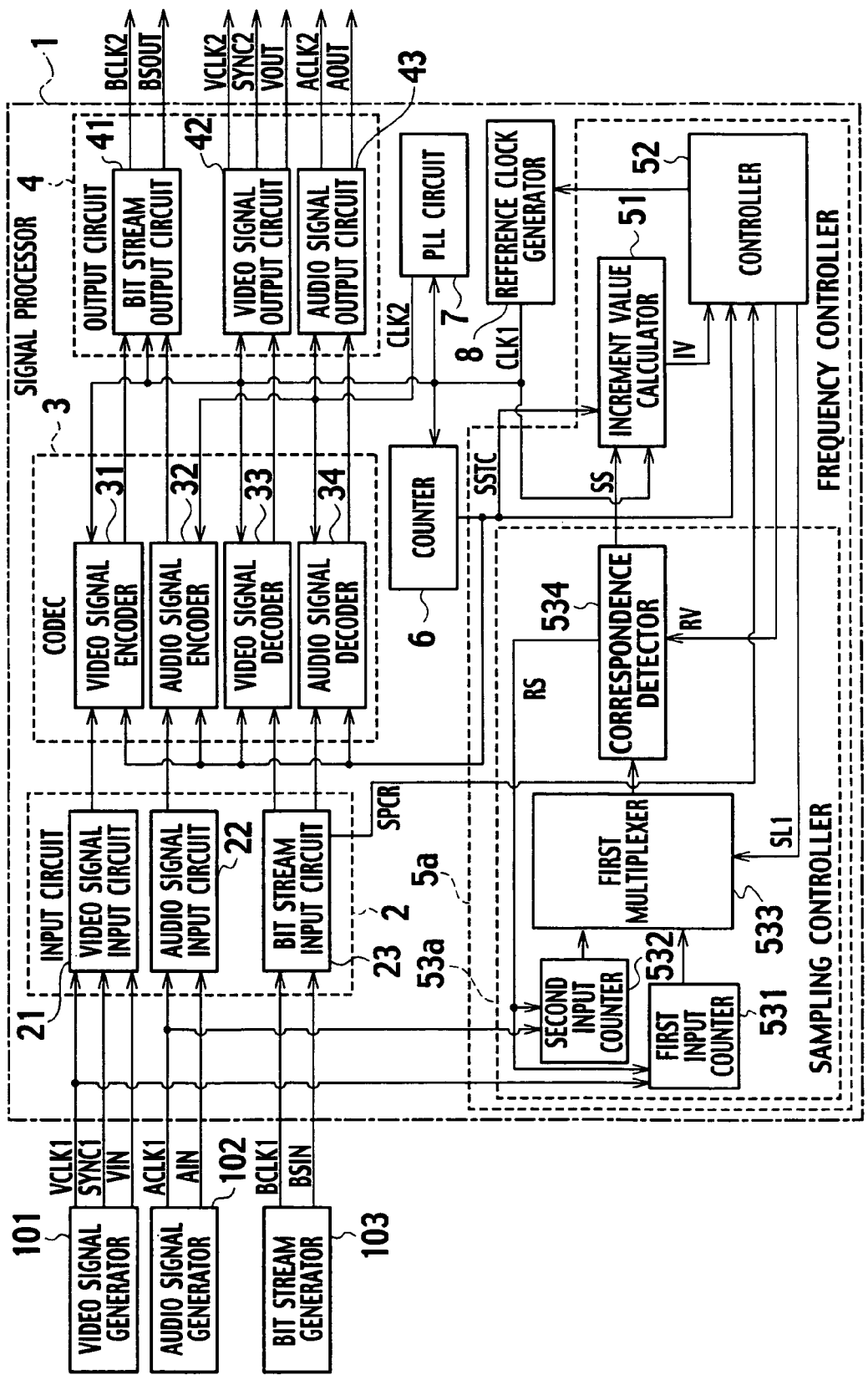
FIG. 1 is a block diagram showing a signal processor according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" define a state in which first and second elements are electrically connected to each other without regard to whether or not there is a physical connection between the elements.

First Embodiment

As shown in FIG. 1, a signal processing system according to a first embodiment of the present invention includes a video signal generator 101, an audio signal generator 102, a bit stream generator 103, and a signal processor 1. The signal processor 1 includes a reference clock generator 8, a counter 6, and a frequency controller 5a. The reference clock generator 8 generates a reference clock CLK1 as a synchronization reference of the signal processing. A voltage controlled crystal oscillator (VCXO) can be used as the reference clock generator 8, for instance. The counter 6 counts the reference clock CLK1. A system time clock (STC) counter that conforms to the MPEG2 standard can be used as the counter 6, for instance. The frequency controller 5a samples a count value SSTC of the counter 6 by utilizing an input clock, compares a increment value that has increased from the last sampled value with an expected value, and controls a frequency of the reference clock CLK1 in accordance with the comparison result. Here, the "input clock" refers to one of a video input clock VCLK1 generated by the video signal generator 101 and an audio input clock ACLK1 generated by the audio signal generator 102, for instance. Alternatively, a synchronization signal SYNC1 of a video input signal VIN can be used as the input clock. The "synchronization signal SYNC1" refers to a field synchronization signal of the video input signal VIN, a horizontal synchronization signal of the video input signal VIN, or a vertical synchronization signal of the video input signal VIN.

A digital video (DV) camera, an optical disk drive, or video tape recorder (VTR) can be used as the video signal generator 101. A compact disk (CD) player or a mini disk (MD) player can be used as the audio signal generator 102. A digital broadcast receiver can be used as the bit stream generator 103.

The signal processor 1 further includes a PLL circuit 7, an input circuit 2, a codec 3, and an output circuit 4. The PLL circuit 7 generates a controlled clock CLK2 by controlling the reference clock CLK1. The input circuit 2 executes a pre-process of the signal processing, i.e., the encoding and the decoding. Specifically, the input circuit 2 includes a video signal input circuit 21 having an input connected to an output of the video signal generator 101, an audio signal input circuit 22 having an input connected to an output of the audio signal generator 102, and a bit stream input circuit 23 having an input connected to an output of the bit stream generator 103.

The codec 3 includes a video signal encoder 31, an audio signal encoder 32, a video signal decoder 33, and an audio signal decoder 34. An input of the video signal encoder 31 is connected to each output of the video signal input circuit 21, the counter 6, and the reference clock generator 8. An input of the audio signal encoder 32 is connected to each output of the audio signal input circuit 22, the counter 6, and the PLL circuit 7. An input of the video signal decoder 33 is connected to the bit stream input circuit 23, the counter 6, and the reference clock generator 8. An input of the audio signal decoder 34 is connected to each output of the bit stream input circuit 23, the counter 6, and the PLL circuit 7.

The video signal input circuit 21 divides the video input signal VIN into lines and frames by utilizing the synchronization signal SYNC1. Each frame of the divided video input signal VIN is stored in an inner memory of the video signal input circuit 21, and the stored video input signal VIN is transmitted to the video signal encoder 31. The audio signal input circuit 22 samples and stores audio input signal AIN by utilizing the audio input clock ACLK1, and the stored audio input signal AIN is transmitted to the audio signal encoder 32. The bit stream input circuit 23 extracts a clock component, i.e., PCR included in the input bit stream BSIN, and generates a PCR signal. The value of the PCR is counted up by a transmitter of the input bit stream BSIN, i.e., a broadcasting station.

The counter 6 has a precision corresponding to the PCR, and is counted up by the reference clock CLK1. The frequency controller 5a controls the frequency of the reference clock CLK1 so that the value of PCR and the value of the count value SSTC of the counter 6 are equal when the signal processor 1 only executes a decoding of the input bit stream BSIN.

The video signal encoder 31 encodes an output signal of the video signal input circuit 21 by utilizing both the count value SSTC of the counter 6 and reference clock CLK1. The audio signal encoder 32 encodes an output signal of the audio signal input circuit 22 by utilizing both the count value SSTC of the counter 6 and the controlled clock CLK2.

The video signal decoder 33 decodes an output signal of the bit stream input circuit 23 by utilizing both the count value SSTC of counter 6 and the reference clock CLK1. The audio signal decoder 34 decodes an output signal of the bit stream input circuit 23 by utilizing both the count value SSTC of the counter 6 and the controlled clock CLK2.

Here, since the reference clock CLK1 and the controlled clock CLK2 are synchronized with each other, the video signal encoder 31, the audio signal encoder 32, the video signal decoder 33, and the audio signal decoder 34 are synchronized with each other. When the video input signal VIN and the audio input signal AIN are encoded at the same time, it is possible to decrease the synchronization frequency of the video input signal VIN and the audio input signal AIN by skipping and repeating the video input signal VIN in each frame.

The output circuit 4 includes a bit stream output circuit 41, a video signal output circuit 42, and an audio signal output circuit 43. An input of the bit stream output circuit 41 is connected to each output of the video signal encoder 31, the reference clock generator 8, and the audio signal encoder 32. An input of the video signal output circuit 42 is connected to each output of the video signal decoder 33 and the reference clock generator 8. An input of the audio signal output circuit 43 is connected to each output of the audio signal decoder 34 and the PLL circuit 7.

For example, an output of the bit stream output circuit 41 is connected to a hard disk drive (HDD) or an optical disk drive. Each output of the video signal output circuit 42 and the audio signal output circuit 43 are connected to a television set, for instance.

The bit stream output circuit 41 processes each output signal of the video signal encoder 31 and the audio signal encoder 32 in synchronization with the reference clock CLK1, and generates an output bit stream BSOUT and a bit stream output clock BCLK2. As a result, the bit stream output clock BCLK2 become a clock synchronized with the reference clock CLK1.

The video signal output circuit 42 processes an output signal of the video signal decoder 33 in synchronization with the reference clock CLK1, and generates a video output clock VCLK2, a synchronization signal SYNC2, and a video output signal VOUT. As a result, the video output clock VCLK2 is synchronized with the reference clock CLK1.

The audio signal output circuit 43 processes an output signal of the audio signal decoder 34 in synchronization with the controlled clock CLK2, and generates an audio output clock ACLK2 and an audio output signal AOUT. As a result, the audio output clock ACLK2 is synchronized with the controlled clock CLK2 and the reference clock CLK1.

The frequency controller 5a includes a sampling controller 53a, an increment value calculator 51, and a controller 52. An input of the increment value calculator 51 is connected to each output of the counter 6, the reference clock generator 8, and the sampling controller 53a. The sampling controller 53a counts the input clock, i.e., one of the video input clock VCLK1 and the audio input clock ACLK1, and generates a sampling control signal SS and a reset signal RS each time that the count result reaches a fixed count value RV. The sampling control signal SS is set to a high level during a period detectable of the increment value calculator 51, based on the video input clock VCLK1, the audio input clock ACLK1, and a first select signal SL1.

The increment value calculator 51 calculates the value IV increased from the last sampled value by sampling the count value SSTC of the counter 6 in accordance with the sampling control signal SS. The controller 52 controls the frequency of the reference clock CLK1 by comparing the increment value IV calculated by the increment value calculator 51 with the expected value.

For example, a digital to analog (D/A) converter (not illustrated) is connected between the controller 52 and the reference clock generator 8 when the VCXO is used as the reference clock generator 8. In this case, the D/A converter converts a digital signal representing a voltage value from the controller 52 to an analog signal. Alternatively, a pulse width modulation (PWM) circuit (not illustrated) and an integrator (not illustrated) are connected between the controller 52 and the reference clock generator 8. In this case, a control voltage is supplied to the reference clock generator 8 by controlling the pulse width of an output pulse of the PWM circuit by the controller 52.

The sampling controller 53a includes a first input counter 531, a second input counter 532, a first multiplexer 533, and a correspondence detector 534. The first input counter 531 has an input connected to each output of the video signal generator 101 and correspondence detector 534. The second input counter 532 has an input connected to each output of the audio signal generator 102 and the correspondence detector 534. The first multiplexer 533 has an input connected to each output of the first input counter 531, the second input counter 532, and the controller 52. The correspondence detector 534 has an input connected to each output of the first multiplexer 533 and the controller 52.

The first input counter 531 counts the video input clock VCLK1. The second input counter 532 counts the audio input clock ACLK1. The first multiplexer 533 selects one of the first input counter 531 and the second input counter 532 in accordance with the first select signal SL1 from the controller 52. The correspondence detector 534 generates the sampling control signal SS and the reset signal RS when an output signal of the first multiplexer 533 and the fixed count value RV supplied by the controller 52 are equal. Here, the reset signal RS resets each count value of the first input counter 531 and the second input counter 532.

Figure 2:
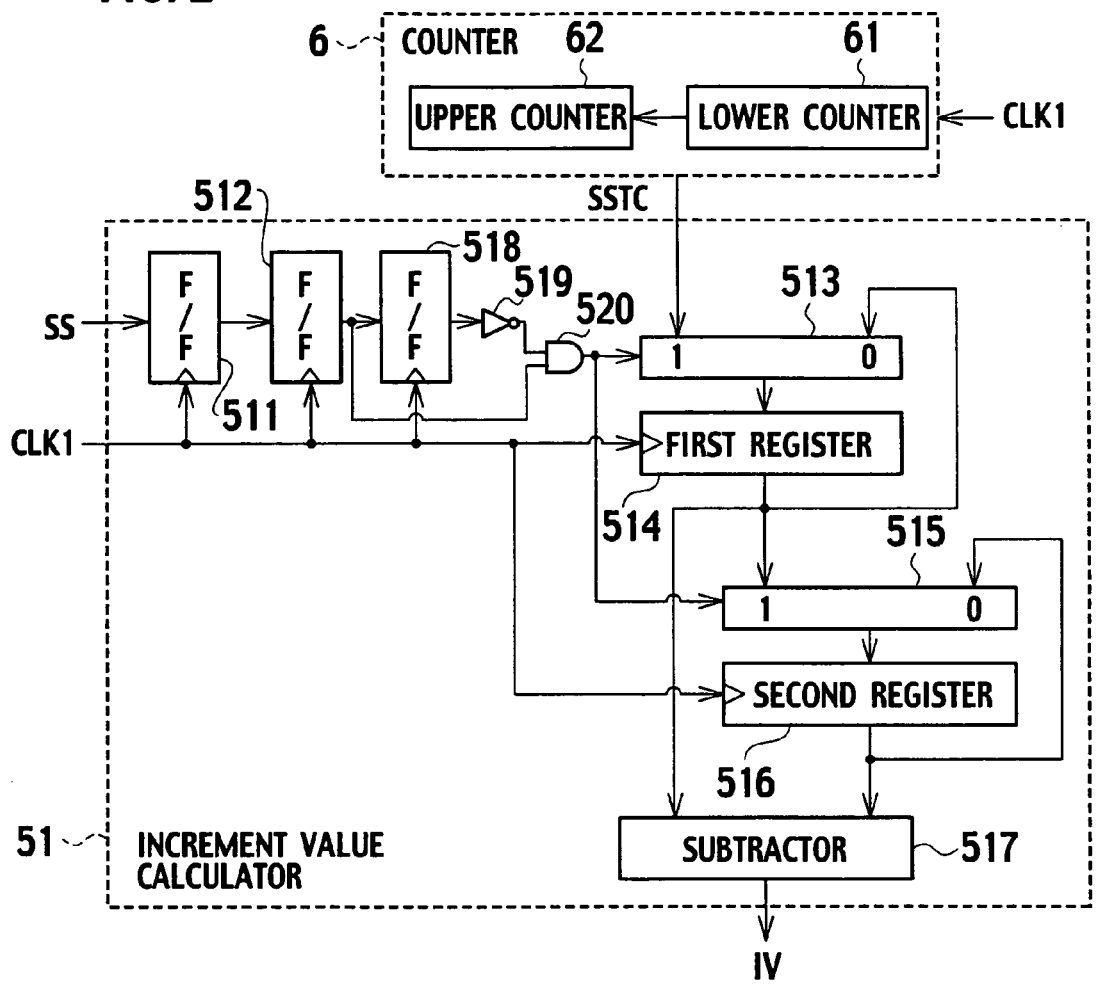
FIG. 2 is a block diagram showing an increment value calculator according to the first embodiment of the present invention.

As shown in FIG. 2, the increment value calculator 51 includes a first flip-flop (F/F) 511, a second F/F 512, a third F/F 518, a first sampling multiplexer 513, a first register 514, a second sampling multiplexer 515, a second register 516, a subtractor 517, an inverter 519, and an AND circuit 520. The first F/F 511 has an input connected to the correspondence detector 534 shown in FIG. 1, and a clock input terminal connected to the reference clock generator 8 shown in FIG. 1. The second F/F 512 has an input connected to an output of the first F/F 511, and a clock input terminal connected to the reference clock generator 8. The third F/F 518 has an input connected to an output of the second F/F 512, and a clock input terminal connected to the reference clock generator 8. The inverter 519 has an input connected to an output of the third F/F 518. The AND circuit 520 has an input connected to each output of the inverter 519 and the second F/F 512.

The first sampling multiplexer 513 has an input connected to each output of the counter 6, the first register 514, and the AND circuit 520. The first register 514 has an input connected to an output of the first sampling multiplexer 513, and a clock input terminal connected to the output of the reference clock generator 8. The second sampling multiplexer 515 has an input connected to each output of the first register 514, the second register 516, and the AND circuit 520. The second register 516 has an input connected to an output of the second sampling multiplexer 515, and a clock input terminal connected to the output of the reference clock generator 8. The subtractor 517 has an input connected to each output of the first register 514 and the second register 516.

The first F/F 511 holds the sampling control signal SS in synchronization with the reference clock CLK1. The second F/F 512 holds an output signal of the first F/F 511 in synchronization with the reference clock CLK1. The third F/F 518 holds an output signal of the second F/F 512 in synchronization with the reference clock CLK1. The inverter 519 inverts an output signal of the third F/F 518. The AND circuit 520 executes an AND operation to each output signal of the inverter 519 and the second F/F 512.

The first sampling multiplexer 513 selects one of each output signal of the counter 6 and the first register 514 in accordance with an output signal of the AND circuit 520. The first register 514 stores an output signal of the first sampling multiplexer 513 in synchronization with the reference clock CLK1. The second sampling multiplexer 515 selects one of each output signal of the first register 514 and the second register 516 in accordance with an output signal of the AND circuit 520. The second register 516 stores an output signal of the first sampling multiplexer 513 in synchronization with the reference clock CLK1. The subtractor 517 calculates a difference value of each output signal of the first register 514 and the second register 516.

The last count value sampled in the first register 514 is sampled by the second register 516 at the same time that the first register 514 samples the count value SSTC of the counter 6. By the count value SSTC sampled by the first register 514 and the second register 516, the subtractor 517 calculates the difference value. As a result, the increment value IV of the count value SSTC of the counter 6 is obtained.

A lower counter 61, and an upper counter 62 connected to the lower counter 61 are provided when the STC counter is used as the counter 6. The lower counter 61 has a bit length of nine bits, and counts 300 counts from zero to 299. The upper counter 62 has a bit length of 32 bits, and counts up when the lower counter 61 counts 300. As a result, the upper counter 62 operates at 90 [kHz] when the frequency of the reference clock CLK1 is 27 [MHz].

Here, it is assumed that the clock frequency of the reference clock CLK1 is "fCLK1", the clock frequency of the video input clock VCLK1 or the audio input clock ACLK1 is "fINCLK", the fixed count value is "RV", and the expected value of the increment value IV is "EV". The expected value EV can be calculated by the following equation (1).

$$EV = fCLK1/fINCLK * RV \quad (1)$$

Here, the expected value EV is an integer. For example, the fixed count value RV is set to 18432, and the expected value EV of the increment value IV is set to 27000 (90×300+0) when the reference clock generator 8 shown in FIG. 1 generates the reference clock CLK1 having the clock frequency of 27 [MHz] in synchronization with the audio input clock ACLK1 having the clock frequency (sample frequency) of 18.432 [MHz] (=384×48 [kHz]).

Figure 3:
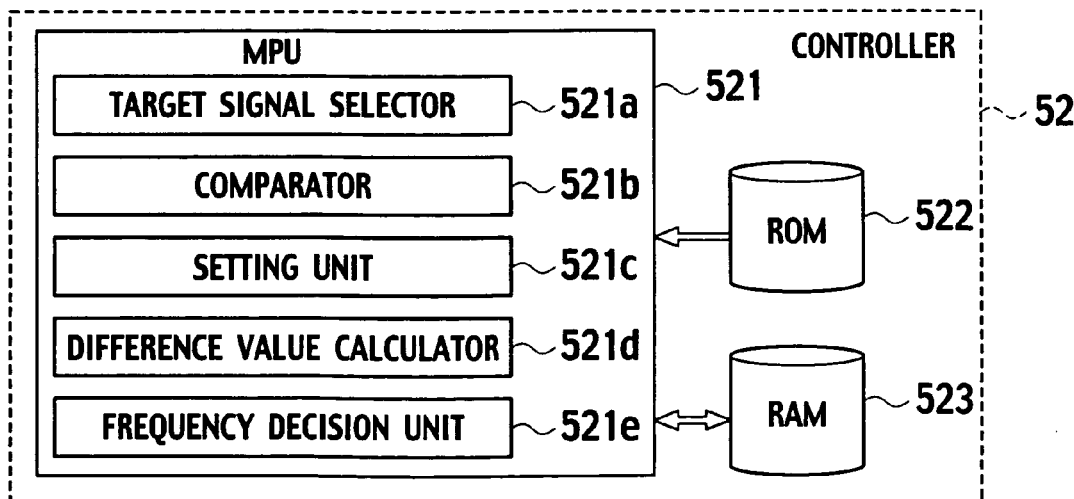
FIG. 3 is a schematic diagram showing a controller according to the first embodiment of the present invention.

As shown in FIG. 3, the controller 52 includes a micro processing unit (MPU) 521, and ROM 522 and RAM 523 connected to the MPU 521. The MPU 521 includes a target signal selector 521a, a comparator 521b, a setting unit 521c, a difference value calculator 521d, and a frequency decision unit 521e, for instance. The target signal selector 521a selects one of the PCR signal SPCR, the video input clock VCLK1, and the audio input clock ACLK1 shown in FIG. 1 as a synchronization target. The setting unit 521c reads out the fixed count value RV and the expected value EV corresponded to the video input clock VCLK1 and the audio input clock ACLK1 from the ROM 522. When the PCR signal SPCR is selected as the synchronization target, the comparator 521b determines whether the value of the PCR signal SPCR and the count value SSTC of the counter 6 are equal. The frequency decision unit 521e decides the frequency of the reference clock CLK1 in accordance with the relation between the value of the PCR signal SPCR and the count value SSTC of the counter 6.

When the video input clock VCLK1 or the audio input clock ACLK1 is selected as the synchronization target, the comparator 521b determines whether the increment value IV calculated by the increment value calculator 51 shown in FIG. 1 and the expected value EV are equal. When the increment value IV and the expected value EV are not equal, the difference value calculator 521d calculates the difference value between the increment value IV and the expected value EV.

When the difference value between the increment value IV and the expected value EV is more than a reference value, the frequency decision unit 521e determines that an abnormality occurs, and maintains the frequency of the reference clock CLK1. On the other hand, when the difference value between the increment value IV and the expected value EV is not more than a reference value, the frequency decision unit 521e decides the frequency of the reference clock CLK1 in accordance with the relation between the increment value IV and the expected value EV.

The ROM 522 functions as a program storage for storing a program to be executed by the MPU 521 except for storing a correspondence table of the fixed count value RV and the expected value EV. The RAM 523 is utilized as a work buffer memory for MPU 521 in executing a program.

When the video input clock VCLK1 or the audio input clock ACLK1 is selected as the synchronization target, the frequency decision unit 521e can detect an abnormal state, such as a halt of the video signal generator 101 or the audio signal generator 102 shown in FIG. 1, a disconnection of a signal line between the video signal generator 101 and the signal processor 1, and a disconnection of a signal line between the audio signal generator 102 and the signal processor 1. The frequency of the reference clock CLK1 is maintained when the frequency decision unit 521e detects the abnormal state.

Figure 4:
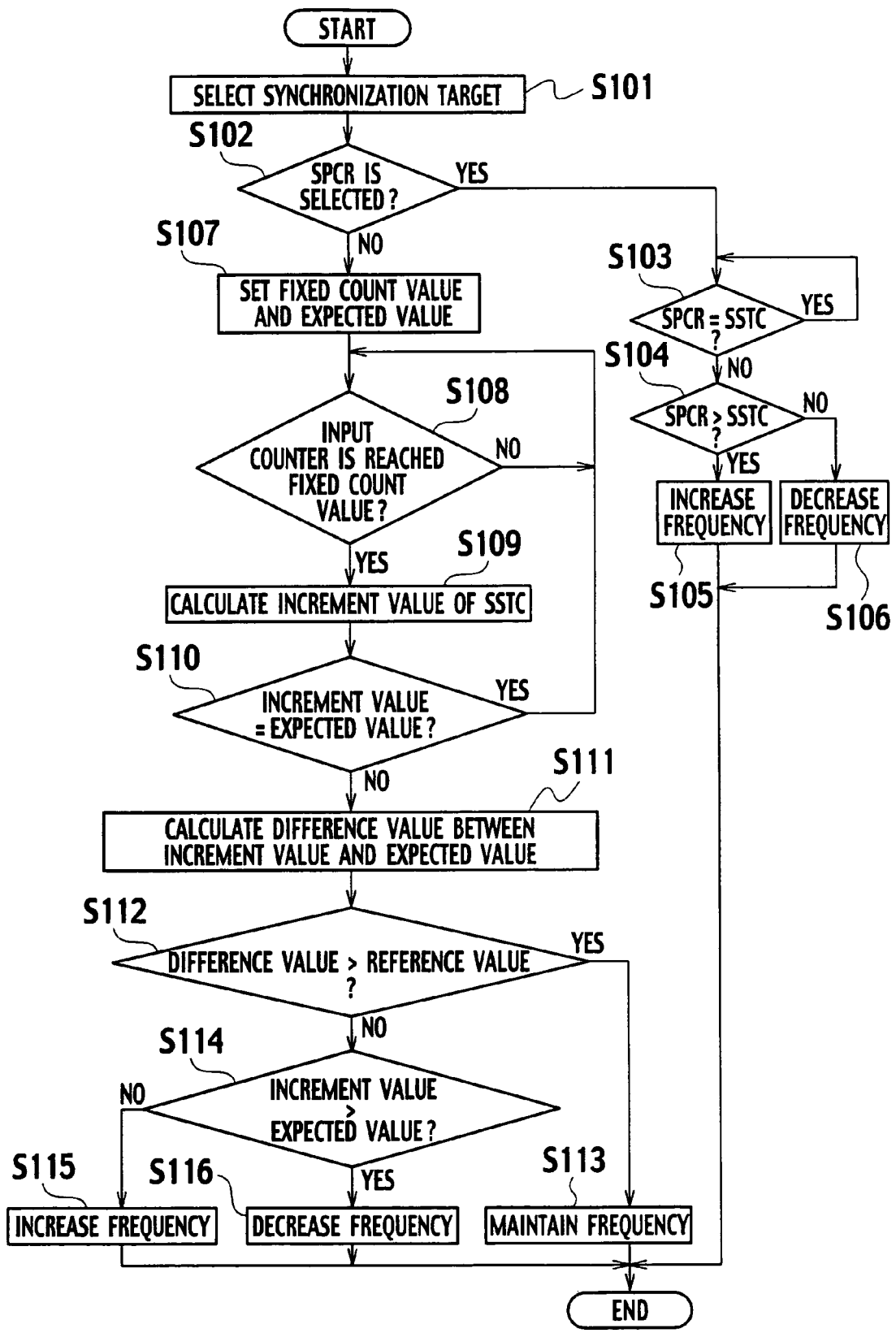
FIG. 4 is a flowchart showing a method for processing a signal according to the first embodiment of the present invention.

Next, a method for processing a signal according to the first embodiment will be described by referring to a flowchart shown in FIG. 4.

In step S101, the target signal selector 521a shown in FIG. 3 selects one of the PCR signal SPCR, the video input clock VCLK1, and the audio input clock ACLK1 shown in FIG. 1 as the synchronization target of the reference clock CLK1. For example, it is assumed that the encoding of the video input signal VIN and the decoding of the input bit stream BSIN are executed at the same time. When the encoding of the video input signal VIN is preceded, the video input clock VCLK1 is selected as the synchronization target of the reference clock CLK1. On the other hand, the PCR signal SPCR is selected as the synchronization target of the reference clock CLK1 when the decoding of the input bit stream BSIN is preceded.

In step S102, the target signal selector 521a determines whether the PCR signal SPCR is selected. When the PCR signal SPCR is selected, the procedure goes to step S103. When the video input clock VCLK1 or the audio input clock ACLK1 is selected, the procedure goes to step S107.

In step S103, the comparator 521b determines whether each value of the PCR signal SPCR and the count value SSTC of the counter 6 is equal. When each value of the PCR signal SPCR and the count value SSTC is not equal, the procedure goes to step S104.

In step S104, the comparator 521b determines whether the value of the PCR signal SPCR is more than the count value SSTC of the counter 6. When it is determined that the value of the PCR signal SPCR is more than the count value SSTC of the counter 6, the procedure goes to step S105. When it is determined that the value of the PCR signal SPCR is not more than the count value SSTC of the counter 6, the procedure goes to step S106.

In step S105, the frequency decision unit 521e increases the frequency of the reference clock CLK1.

In step S106, the frequency decision unit 521e decreases the frequency of the reference clock CLK1.

In step S107, the setting unit 521c reads the fixed count value RV and the expected value EV corresponding to the synchronization target selected by the target signal selector 521a from the ROM 522, based on the equation (1). The fixed count value RV read from the ROM 522 is transmitted to the correspondence detector 534 shown in FIG. 1. The expected value EV read from the ROM 522 is stored in the RAM 523, for instance.

In step S108, the correspondence detector 534 determine whether one of the count value of the first input counter 531 and the second input counter 532 selected by the first multiplexer 533 is reached to the fixed count value RV. When it is determined that the count value of the first input counter 531 or the second input counter 532 is reached to the fixed count value RV, the procedure goes to step S109.

In step S109, the increment value calculator 51 samples the count value SSTC of the counter 6 shown in FIG. 1, and calculates the value IV increased from the last sampled value.

In step S110, the comparator 521b determines whether the increment value IV calculated by the increment value calculator 51 and the expected value EV stored in the RAM523 are equal. When it is determined that the increment value IV and the expected value EV are equal, the procedure returns to step S108. When it is determined that the increment value IV and the expected value EV are not equal, the procedure goes to step S111.

In step S111, the difference value calculator 521d shown in FIG. 3 calculates the difference value between the increment value IV and the expected value EV.

In step S112, the frequency decision unit 521e shown in FIG. 3 determines that the difference value between the increment value IV and the expected value EV is more than the reference value. Here, the data of the reference value is previously stored in the ROM 522, for instance. When it is determined that the difference value between the increment value IV and the expected value EV is more than the reference value, the procedure goes to step S113. In step S113, the frequency decision unit 521e maintains the frequency of the reference clock CLK1. When it is determined that the difference value between the increment value IV and the expected value EV is not more than the reference value, the procedure goes to step S114.

In step S114, the frequency decision unit 521e determines that the increment value IV is more than the expected value EV. When it is determined that the increment value IV is more than the expected value EV, the procedure goes to step S116. When it is determined that the increment value IV is not more than the expected value EV, the procedure goes to step S115.

For example, it is assumed that the expected value EV is 27000 (90×300+0), the count value of the upper counter 62 shown in FIG. 2 is more than 90, and the count value of the lower counter 61 is more than 0. In this case, the procedure goes to step S116.

In step S115, the frequency decision unit 521e increases the frequency of the reference clock CLK1. In step S116, the frequency decision unit 521e decreases the frequency of the reference clock CLK1.

As described above, the signal processor 1 samples the count value SSTC of the counter 6 by utilizing the input clock, i.e., the video input clock VCLK1 or the audio input clock ACLK1, and controls the frequency of the reference clock CLK1 by comparing the increment value IV with the expected value EV. As a result, it is possible to generate the reference clock CLK1 synchronized with the input clock. Therefore, it is possible to reduce the number of PLL circuits for controlling the input clock. Since it is possible to divert a STC counter necessary for reproducing the input bit stream BSIN that conforms to the MPEG2 standard as the counter 6, it is possible to suppress an increase of the circuit scale and the cost to the minimum. Furthermore, it is possible to avoid a malfunction of the signal processor 1 by maintaining the frequency of the reference clock CLK1 when the controller 52 detects an occurrence of an abnormal state.

Second Embodiment

Figure 5:
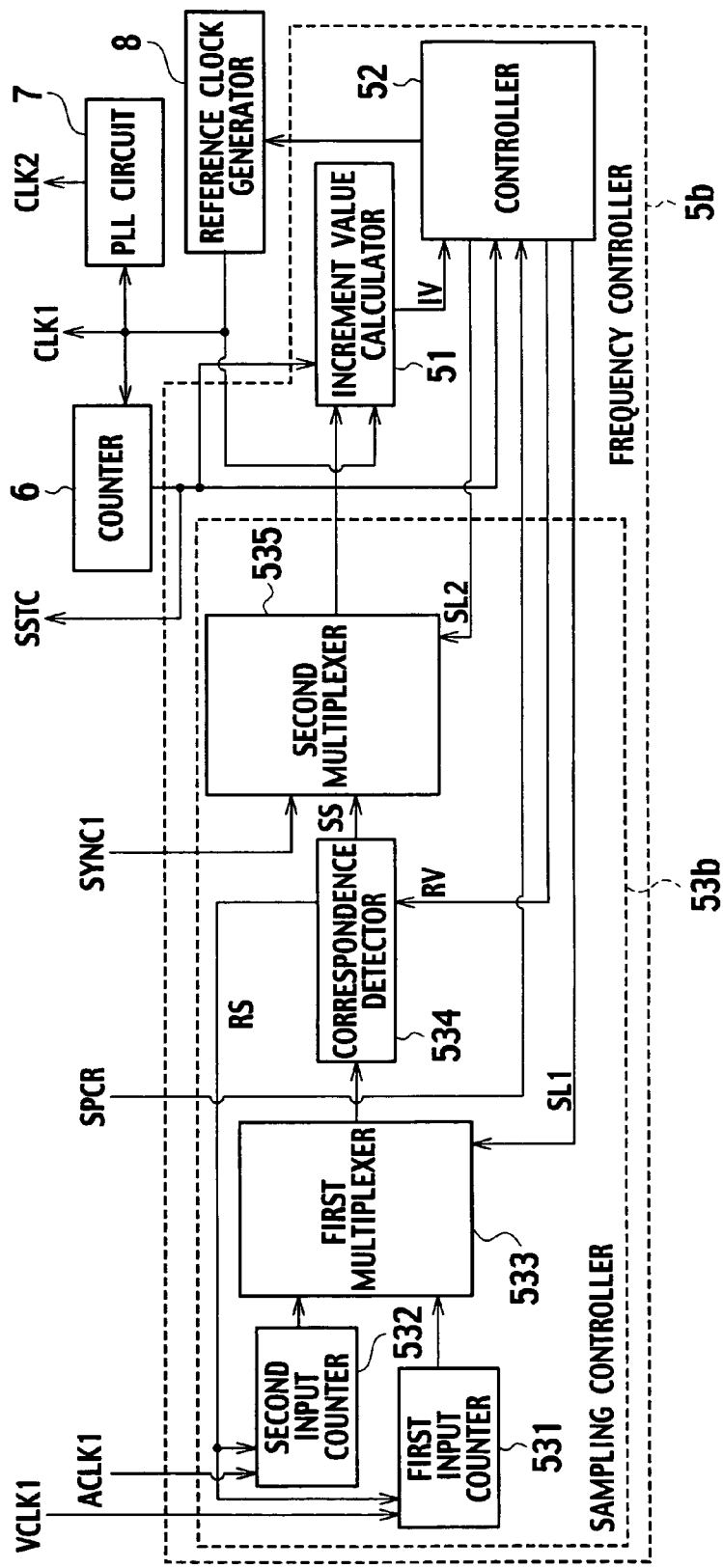
FIG. 5 is a block diagram showing a frequency controller according to a second embodiment of the present invention.

As shown in FIG. 5, a frequency controller 5b according to a second embodiment of the present invention differs from FIG. 1 in that the sampling controller 53b includes a second multiplexer 535 configured to select one of the sampling control signal SS generated by the correspondence detector 534 and the synchronization signal SYNC1 of the video input signal VIN generated by the video signal generator 101 shown in FIG. 1, based on a second select signal SL2 generated by the controller 52. That is, the frequency controller 5b shown in FIG. 5 can utilize the synchronization signal SYNC1 of the video input signal VIN as the input clock for the synchronization target of the reference clock CLK1. Other arrangements are similar to the signal processor 1 shown in FIG. 1.

Here, it is assumed that the clock frequency of the reference clock CLK1 is "fCLK1", the frequency of the synchronization signal SYNC1 of the video input signal VIN is "fSYNC1", and the expected value is "EV". The expected value EV can be calculated by the following equation (2).

$$EV = fCLK1/fINCLK \qquad (2)$$

When a frame synchronization signal that conforms to the national television standards committee (NTSC) system is utilized as the synchronization signal SYNC1, the frequency fSYNC1 is 29.97 [Hz] (≈30×1000/1001). When the reference clock generator 8 generates the reference clock CLK1 having 27 [MHz] in synchronization with the frame synchronization signal, the expected value EV is 27×1000×1000/(30×1000/1001)=900900 in accordance with the equation (2).

Figure 6:
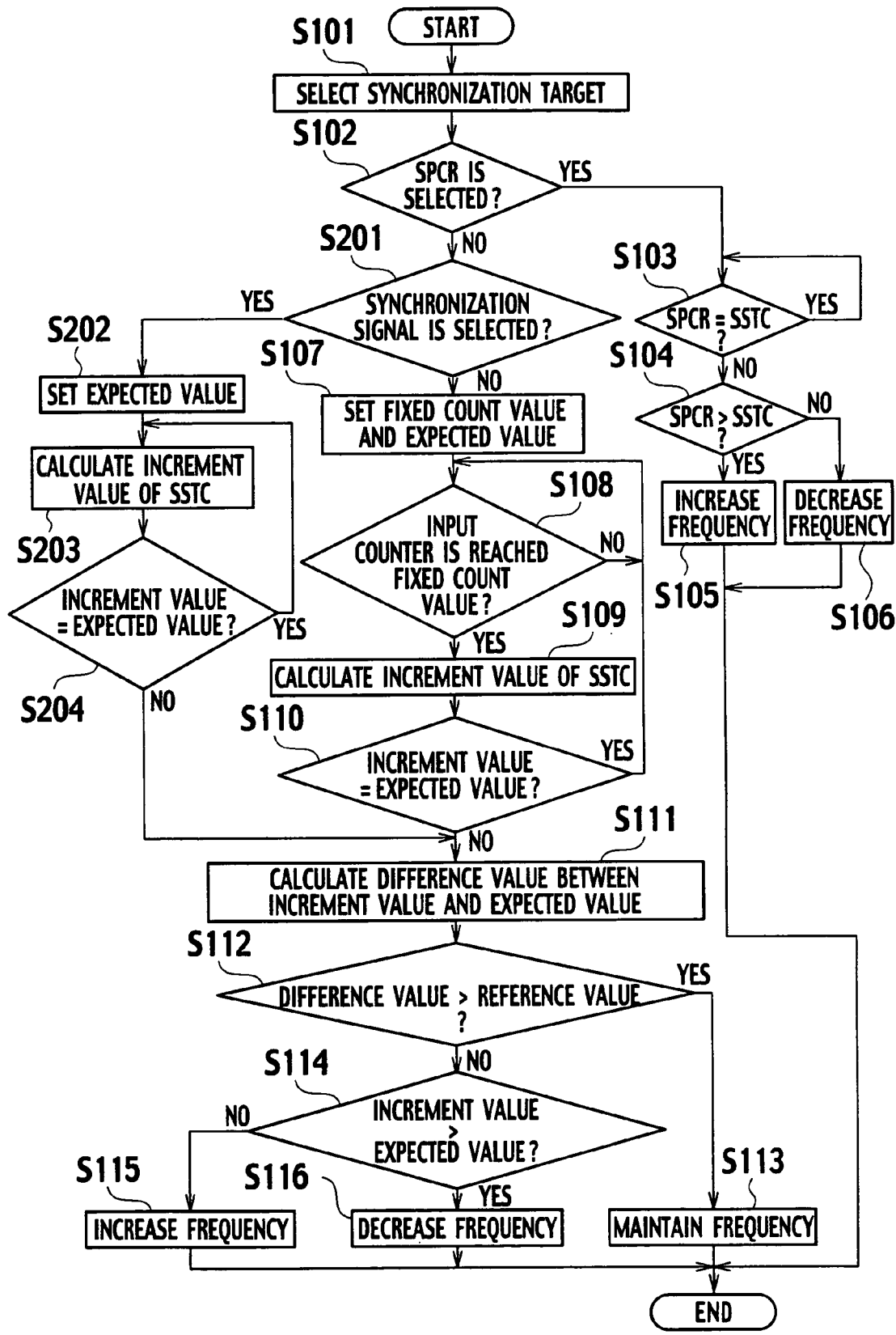
FIG. 6 is a flowchart showing a method for processing a signal according to the second embodiment of the present invention.

Next, a method for processing a signal according to the first embodiment will be described by referring to a flowchart shown in FIG. 6. Repeated descriptions for the same processing according to the second embodiment which are the same as the first embodiment are omitted.

In step S201, the target signal selector 521a shown in FIG. 3 determines whether the synchronization signal SYNC1 of the video input signal VIN is selected as the synchronization target. When the synchronization signal SYNC1 of the video input signal VIN is selected as the synchronization target, the procedure goes to step S202. When the video input clock VCLK1 or the audio input clock ACLK1 is selected as the synchronization target, the procedure goes to step S107.

In step S202, the setting unit 521c shown in FIG. 3 sets the expected value EV corresponding to the synchronization signal SYNC1 of the video input signal VIN from the ROM 522, based on the equation (2). The expected value EV read from the ROM 522 is stored in the RAM 523, for instance.

In step S203, the increment value calculator 51 shown in FIG. 5 samples the count value SSTC of the counter 6 in synchronization with the synchronization signal SYNC1 of the video input signal VIN, and calculates the value IV increased from the last sampled value.

In step S204, the comparator 521b shown in FIG. 3 determines whether the increment value IV calculated by the increment value calculator 51 and the expected value EV stored in the RAM 523 are equal. When it is determined that the increment value IV and the expected value EV are equal, the procedure returns to step S203. When it is determined that the increment value IV and the expected value EV are not equal, the procedure goes to step S111.

As described above, the frequency controller 5b according to the second embodiment samples a count value of the counter by utilizing the synchronization signal SYNC1 of the video input signal VIN, to compare the increment value IV increased from the last sampled value with the expected value EV, and to control the frequency of the reference clock CLK1. Therefore, it is possible to reduce the number of PLL circuits, as the same as the frequency controller 5a shown in FIG. 1.

Other Embodiments

Various modifications will become possible for those skilled in the art after receiving the teachings of the present disclosure without departing from the scope thereof.

With respect to the aforementioned first and second embodiments, the description has been given with regard to an example in which the signal processor 1 executes encoding/decoding as the signal processing. However, the frequency controllers 5a and 5b can be applied to various signal processor without limiting to the signal processor 1 executing the encoding/decoding.

In the first embodiment, the description has been given with regard to an example in which the frequency controller 5a synchronizes the input clock, i.e., the video input clock VCLK1 or the audio input clock ACLK1 with the reference clock CLK1.

In the second embodiment, the description has been given with regard to an example in which the frequency controller 5b synchronizes the input clock or the synchronization signal SYNC1 of the video input signal VIN with the reference clock CLK1.

However, the frequency controller 5b only synchronizes the synchronization signal SYNC1 of the video input signal VIN with the reference clock CLK1. In this case, the synchronization signal SYNC1 of the video input signal VIN is directly supplied to the increment value calculator 51 shown in FIG. 5. As a result, it becomes possible to omit the first input counter 531, the second input counter 532, the first multiplexer 533, the correspondence detector 534, and the second multiplexer 535 shown in FIG. 5.

In the first and second embodiments, the description has been given with regard to an example in which a plurality of combinations of fixed count value RV and expected value EV are stored in the ROM 522 shown in FIG. 3. However, the setting unit 521c may dynamically calculate the fixed count value RV and the expected value EV based on the equation (1) and the equation (2).

What is claimed is:

1. A signal processor comprising:
   a reference clock generator configured to generate a reference clock as a synchronization reference for a signal processing;
   a counter configured to count the reference clock; and
   a frequency controller configured to sample a count value of the counter by utilizing an input clock, to compare an increment value increased from the last sampled value with an expected value, and to control a frequency of the reference clock in accordance with a comparison result, wherein a video input clock and an audio input clock is utilized as the input clock.

2. A signal processor comprising:
a reference clock generator configured to generate a reference clock as a synchronization reference for a signal processing;
a counter configured to count the reference clock; and
a frequency controller configured to sample a count value of the counter by utilizing an input clock, to compare an increment value increased from the last sampled value with an expected value, and to control a frequency of the reference clock in accordance with a comparison result, wherein the frequency controller comprises:
a sampling controller configured to count the input clock, and to generate a sampling control signal each time that a count result reaches a fixed count value;
an increment value calculator configured to calculate the increment value by sampling the count value in accordance with the sampling control signal; and
a controller configured to control the frequency by comparing the increment value with the expected value.

3. The signal processor of claim 2, wherein the sampling controller comprises:
a first input counter configured to count a video input clock as the input clock;
a second input counter configured to count an audio input clock as the input clock;
a first multiplexer configured to select one of the first and second input counters in accordance with a first select signal supplied by the controller; and
a correspondence detector configured to generate the sampling control signal when the count value selected by the first multiplexer and the fixed count value are equal.

4. The signal processor of claim 2, wherein the controller calculates a difference value between the increment value and the expected value, and maintains the frequency when the difference value is more than a reference value.

5. The signal processor of claim 4, wherein the controller comprises:
a target signal selector configured to select a synchronization target of the reference clock;
a setting unit configured to set the fixed count value and the expected value corresponding to the synchronization target selected by the target signal selector;
a comparator configured to compare the increment value with the expected value;
a difference value calculator configured to calculate a difference value between the increment value and the expected value when the increment value and the expected value are not equal; and
a frequency decision unit configured to maintain the frequency when the difference value is more than the reference value, and to control the frequency in accordance with a relation between the increment value and the expected value when the difference value is not more than the reference value.

6. The signal processor of claim 2, wherein the increment value calculator comprises:
a first flip-flop configured to hold the sampling control signal in synchronization with the reference clock;
a second flip-flop configured to hold an output signal of the first flip-flop in synchronization with the reference clock;
a third flip-flop configured to hold an output signal of the second flip-flop in synchronization with the reference clock;
an inverter configured to invert an output signal of the third;
an AND circuit configured to execute an AND operation to each output signal of the inverter and the second F/F:
a first register configured to store the count value in synchronization with the reference clock;
a first sampling multiplexer configured to select one of each output signal of the counter and the first register in accordance with an output signal of the AND circuit;
a second register configured to store an output signal of the first register in synchronization with the reference clock;
a second sampling multiplexer configured to select one of each output signal of the first register and the second register in accordance with the output signal of the AND circuit; and
a subtractor configured to calculate a difference value of each output signal of the first and second registers.

7. A signal processor comprising:
a reference clock generator configured to generate a reference clock as a synchronization reference for a signal processing;
a counter configured to count the reference clock; and
a frequency controller configured to sample a count value of the counter by utilizing an input clock, to compare an increment value increased from the last sampled value with an expected value, and to control a frequency of the reference clock in accordance with a comparison result, wherein the frequency controller comprises:
a sampling controller configured to count the input clock, and to generate a sampling control signal each time that a count result reaches a fixed count value;
an increment value calculator configured to calculate the increment value by sampling the count value in accordance with one of the sampling control signal and a synchronization signal of a video input signal; and
a controller configured to control the frequency by comparing the increment value with the expected value.

8. The signal processor of claim 7, wherein the sampling controller comprises:
a first input counter configured to count a video input clock as the input clock;
a second input counter configured to count an audio input clock as the input clock;
a first multiplexer configured to select one of the first and second input counters in accordance with a first select signal supplied by the controller;
a correspondence detector configured to generate the sampling control signal when the count value selected by the first multiplexer and the fixed count value are equal; and
a second multiplexer configured to select one of the sampling control signal and the synchronization signal in accordance with a second select signal supplied by the controller.

9. The signal processor of claim 7, wherein the controller calculates a difference value between the increment value and the expected value, and maintains the frequency when the difference value is more than a reference value.

10. A signal processor comprising:
a reference clock generator configured to generate a reference clock as a synchronization reference for a signal processing;
a counter configured to count the reference clock; and
a frequency controller configured to sample a count value of the counter by utilizing a synchronization signal of a video input signal, to compare an increment value increased from the last sampled value with an expected value, and to control a frequency of the reference clock in accordance with a comparison result.

11. A signal processor comprising:

a reference clock generator configured to generate a reference clock as a synchronization reference for a signal processing;

a counter configured to count the reference clock; and a frequency controller configured to sample a count value of the counter by utilizing a synchronization signal of a video input signal, to compare an increment value increased from the last sampled value with an expected value, and to control a frequency of the reference clock in accordance with a comparison result, wherein the frequency controller comprises:

an increment value calculator configured to calculate the increment value by sampling the count value in accordance with the synchronization signal; and a controller configured to control the frequency by comparing the increment value with the expected value.

12. The signal processor of claim 11, wherein the controller calculates a difference value between the increment value and the expected value, and maintains the frequency when the difference value is larger than a reference value.

13. The signal processor of claim 12, wherein the controller comprises:

a setting unit configured to set the fixed count value and the expected value corresponding to the synchronization signal;

a comparator configured to compare the increment value with the expected value;

a difference value calculator configured to calculate the difference value between the increment value and the expected value when the increment value and the expected value are not equal; and a frequency decision unit configured to maintain the frequency when the difference value is more than the reference value, and to control the frequency in accordance with a relation between the increment value and the expected value when the difference value is not more than the reference value.

14. A method for processing a signal comprising:

generating a reference clock as a synchronization reference for a signal processing;

generating a count value by counting the reference clock;

sampling the count value by utilizing an input clock;

comparing an increment value increased from the last sampled value with an expected value; and controlling a frequency of the reference clock in accordance with a comparison result, the method further comprising:

counting the input clock, and generating a sampling control signal each time that a count result reaches a fixed count value; and calculating the increment value by sampling the count value in accordance with the sampling control signal, the method further comprising:

selecting a synchronization target of the reference clock;

setting the fixed count value and the expected value corresponding to the synchronization target;

calculating a difference value between the increment value and the expected value when the increment value and the expected value are not equal; and maintaining the frequency when the difference value is more than a reference value; and controlling the frequency in accordance with a relation between the increment value and the expected value when the difference value is not more than the reference value.

15. The signal processor of claim 10, wherein the synchronization signal is a field synchronization signal of the video input signal, a horizontal synchronization signal of the video input signal, or a vertical synchronization signal of the video input signal.

* * * * *